US 8,686,847 B2

(12) United States Patent
Lickfelt et al.

(10) Patent No.: US 8,686,847 B2
(45) Date of Patent: *Apr. 1, 2014

(54) TWO AXIS ANTENNA FOR TPMS SENSOR (75) Inventors: Brian K. Lickfelt, Powell, OH (US);
Nicky Strock, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 12/851,390

(22) Filed: Aug. 5, 2010

(65) Prior Publication Data

US 2011/0304452 A1    Dec. 15, 2011

Related U.S. Application Data (60) Provisional application No. 61/354,809, filed on Jun. 15, 2010.

(51) Int. Cl.
| B60C 23/00 | (2006.01) |
| B60R 25/10 | (2013.01) |
| B60C 23/02 | (2006.01) |
| H01Q 7/08  | (2006.01) |

(52) U.S. Cl.
USPC ............ 340/447; 340/426.33; 116/34 A; 116/34 R; 343/788

(58) Field of Classification Search
USPC ............ 340/447, 426.33; 116/34 R, 34 A; 343/788
See application file for complete search history.

(56) References Cited

U.S. PATENT DOCUMENTS

| 5,463,374 A | * | 10/1995 | Mendez et al. ............ 340/442 |
| 5,591,916 A |   | 1/1997  | Byrne |
| 5,963,128 A |   | 10/1999 | McClelland |
| 6,144,113 A |   | 11/2000 | Hayashi et al. |
| 6,340,930 B1 |  | 1/2002  | Lin |
| 6,384,720 B1 |  | 5/2002  | Juzswik et al. |
| 6,445,287 B1 |  | 9/2002  | Schofield et al. |

(Continued)

FOREIGN PATENT DOCUMENTS

| EP | 1547879 | 6/2005 |
| FR | 2884322 | 10/2006 |

OTHER PUBLICATIONS

U.S. Appl. No. 12/851,385, filed Aug. 5, 2010 entitled "Unique Header Format for TPMS and Smart Entry System".

(Continued)

*Primary Examiner* — George Bugg
*Assistant Examiner* — Munear Akki
(74) *Attorney, Agent, or Firm* — Rankin, Hill & Clark LLP (57) ABSTRACT

A vehicle entry/tire pressure monitoring system for a vehicle includes an ECU, LF antennas mounted on the vehicle and being in communication with the ECU, and tire sensors mounted in, on or adjacent respective tires of the vehicle. Each LF antenna is configured to transmit an LF tire sensor wake up field and a SMART entry LF search field to wake up a portable transmission/reception unit for keyless entry of the vehicle tire sensor. Each tire sensor includes a two-axis receiver antenna and an RF transmitter configured to transmit an RF signal. Each two-axis receiver antenna is configured such that a first axis of the two-axis antenna is configured to detect a respective LF field transmitted by one of the LF antennas and a second axis of the two-axis antenna is configured to detect a respective LF field transmitted by another of the LF antennas.

6 Claims, 8 Drawing Sheets

(56) References Cited

U.S. PATENT DOCUMENTS

| | | | |
|---|---|---|---|
| 6,597,284 B2 | 7/2003 | Juzswik | |
| 6,668,636 B2 * | 12/2003 | Nantz et al. | 73/146.4 |
| 6,731,205 B2 * | 5/2004 | Schofield et al. | 340/444 |
| 6,782,240 B1 * | 8/2004 | Tabe | 455/66.1 |
| 6,857,310 B2 | 2/2005 | Bergerhoff et al. | |
| 6,897,769 B2 | 5/2005 | Hayashi et al. | |
| 6,952,160 B1 | 10/2005 | Bennie et al. | |
| 6,967,570 B2 * | 11/2005 | Tsuji et al. | 340/442 |
| 7,019,628 B2 | 3/2006 | Ichinose | |
| 7,026,953 B2 | 4/2006 | Fujii | |
| 7,091,840 B2 | 8/2006 | Ichinose | |
| 7,102,498 B2 | 9/2006 | Desai et al. | |
| 7,113,083 B2 | 9/2006 | Suitsu | |
| 7,145,445 B2 | 12/2006 | Tranchina | |
| 7,327,233 B2 | 2/2008 | Gerardiere | |
| 7,369,043 B2 * | 5/2008 | McQuade | 340/445 |
| 7,385,485 B2 | 6/2008 | Thomas et al. | |
| 7,436,289 B2 | 10/2008 | Desai et al. | |
| 7,456,732 B2 | 11/2008 | Tranchina | |
| 7,467,034 B2 | 12/2008 | Breed et al. | |
| 7,474,195 B2 | 1/2009 | Farrell | |
| 7,490,793 B2 * | 2/2009 | Mackness | 244/100 R |
| 7,518,493 B2 * | 4/2009 | Bryzek et al. | 340/442 |
| 7,602,280 B2 | 10/2009 | Kato et al. | |
| 7,639,121 B2 | 12/2009 | Kim | |
| 7,679,501 B2 * | 3/2010 | Dixon et al. | 340/447 |
| 7,730,773 B2 * | 6/2010 | Bortolin | 73/146.5 |
| 7,808,373 B2 | 10/2010 | Wan | |
| 7,817,026 B2 | 10/2010 | Watabe et al. | |
| 8,022,879 B2 | 9/2011 | Ikeyama | |
| 8,120,474 B2 | 2/2012 | Fujioka et al. | |
| 2003/0179086 A1 | 9/2003 | Nantz et al. | |
| 2004/0113765 A1 | 6/2004 | Suitsu | |
| 2004/0155764 A1 | 8/2004 | Ichinose | |
| 2005/0083175 A1 | 4/2005 | Yanagimoto | |
| 2005/0099274 A1 | 5/2005 | Tranchina | |
| 2005/0109092 A1 | 5/2005 | Martinez Marrufo et al. | |
| 2005/0156795 A1 * | 7/2005 | Yeh | 343/702 |
| 2005/0162264 A1 | 7/2005 | Sekizawa et al. | |
| 2006/0220805 A1 | 10/2006 | Thomas et al. | |
| 2007/0008097 A1 | 1/2007 | Mori et al. | |
| 2007/0090919 A1 | 4/2007 | Desai | |
| 2008/0018444 A1 | 1/2008 | Brown et al. | |
| 2008/0036672 A1 * | 2/2008 | Ueda et al. | 343/788 |
| 2008/0100429 A1 * | 5/2008 | Luo et al. | 340/447 |
| 2008/0143503 A1 | 6/2008 | Watabe et al. | |
| 2008/0143507 A1 | 6/2008 | Cotton et al. | |
| 2008/0150712 A1 * | 6/2008 | Cooprider et al. | 340/447 |
| 2009/0002146 A1 | 1/2009 | Lin | |
| 2009/0021363 A1 | 1/2009 | Heise et al. | |
| 2009/0102634 A1 | 4/2009 | Okada et al. | |
| 2009/0153317 A1 * | 6/2009 | Kim | 340/447 |
| 2009/0179747 A1 | 7/2009 | Lin et al. | |
| 2009/0289783 A1 * | 11/2009 | Kim | 340/447 |
| 2010/0073157 A1 | 3/2010 | Maehara et al. | |
| 2010/0271187 A1 | 10/2010 | Uysal et al. | |
| 2011/0043342 A1 * | 2/2011 | Shepler et al. | 340/431 |
| 2011/0254677 A1 * | 10/2011 | Sun et al. | 340/447 |
| 2011/0304454 A1 | 12/2011 | Lickfelt et al. | |

OTHER PUBLICATIONS

U.S. Appl. No. 12/851,394, filed Aug. 5, 2010 entitled "Memorizing Location of Tires in TPMS and Smart Entry System".

U.S. Appl. No. 12/851,429, filed Aug. 5, 2010 entitled "Radio System Adjustment With TPMS and Smart Entry System".

U.S. Appl. No. 12/851,435, filed Aug. 5, 2010 entitled "Door Open Detection for Use With TPMS and Smart Entry System".

U.S. Appl. No. 12/851,441, filed Aug. 5, 2010 entitled "Recognizing Tire Sensor Location in Factory Mode for TPMS and Smart Entry System".

U.S. Appl. No. 12/851,446, filed Aug. 5, 2010 entitled "Localization of Tire for TPMS and Smart Entry System".

International Search Report and Written Opinion of PCT/US2011/023156 dated May 20, 2011.

Office Action of U.S. Appl. No. 12/851,446, dated Dec. 21, 2012, 31 pages.

Office Action of U.S. Appl. No. 12/851,429, dated Dec. 24, 2012, 28 pages.

Office Action of U.S. Appl. No. 12/851,385 dated Oct. 26, 2012.

Office Action of U.S. Appl. No. 12/851,394 dated Dec. 14, 2012.

Office Action of U.S. Appl. No. 12/851,441 dated Feb. 19, 2013, 42 pages.

Office Action of U.S. Appl. No. 12/851,441 dated Jul. 15, 2013.

Supplementary European Search Report of S/N EP11796100 dated Aug. 1, 2013.

* cited by examiner

| ID | ID | ID | ANTENNA |
|---|---|---|---|
| LF | RF |  | FRONT |
| RF | RR | SP | RIGHT |
| LF | LF | SP | LEFT |
| LR | RR | SP | REAR |

TWO AXIS ANTENNA FOR TPMS SENSOR

This application claims the benefit of U.S. provisional patent application Ser. No. 61/354,809, filed Jun. 15, 2010, which is incorporated by reference in its entirety herein.

BACKGROUND

Exemplary embodiments disclosed herein are directed to tire pressure monitoring systems for vehicles that can also include keyless entry systems. Many cars today apply SMART entry by employing 125 KHz low frequency ("LF") antennas in many locations around the vehicle to localize a SMART search field. For example, an LF antenna can mount to a driver door handle to search an area surrounding the driver door for a portable transmission/reception unit, e.g. a key fob, for keyless entry to the vehicle. These LF SMART search fields are highly controlled, such that specific search patterns can be realized.

By regulation, all vehicles in the United States must include a tire pressure monitoring system ("TPMS"). In a known TPMS, an LF antenna is mounted in each wheel well such that a TPMS control unit can trigger, or wake up, each TPMS sensor, which are each located in a respective tire, via the LF antenna. The TPMS control unit sends a signal to the LF antenna to transmit an LF field to wake up the TPMS sensor. The TPMS control unit can receive a near instantaneous response such that the tire pressure for each wheel is known in seconds and can be presented on a display in the vehicle cabin for the vehicle operator.

Like the known SMART entry systems, known TPMS employ 125 KHz LF antennas. For a vehicle including both SMART entry and TPMS, up to ten individual LF antennas can be required on the vehicle. Both the TPMS sensors and the SMART entry fobs reply to a receiver in the vehicle with an RF signal around 315 MHz. Both systems are slightly offset from this frequency for independent operation, but the frequencies are close enough that similar antennas can be used to receive the signal.

Combining SMART entry and TPMS to reduce the number of LF antennas on the vehicle can result in problems. Known combined SMART entry and TPMS may fail to provide tire pressure data to the operator at the moment (or nearly instantaneously after) the ignition for the vehicle is turned ON. This is due to the fact that localization of the tire sensors can be difficult when the antenna that is used to wake up each tire sensor is not mounted within a respective wheel well. Additionally, since both the tire sensors and the fobs wake up upon detecting an LF field, the fob may respond by sending a signal to a receiver in the vehicle when the LF field was intended to only wake up the tire pressure sensors, and vice versa. This can result in an undesirable drain on the power source for the tire pressure sensors and the fob.

Moreover, providing tire pressure data at ignition ON can present issues. Waking up a tire sensor without moving the tire can present a problem because the tire sensor can be located at nearly an infinite number of positions when a vehicle is parked, and some of these positions may not be conducive for detecting an LF field generated from an antenna that is not located within the wheel well. Moreover, transmitting an LF field strong enough to wake up tire sensors may result in a broadcast AM receiver, which is typically connected with a vehicle radio, picking up the LF field such that undesirable sound is emitted from a speaker connected with the radio. Moreover, problems may arise localizing one or more of the tire sensors when one of the SMART entry and TPMS antennas is mounted on a vehicle door and the door-mounted antenna emits an LF search field to wake up the tire sensors. Moreover, recognizing tire sensor locations when in the manufacturing facility can also present issues.

Figures 10, 11:
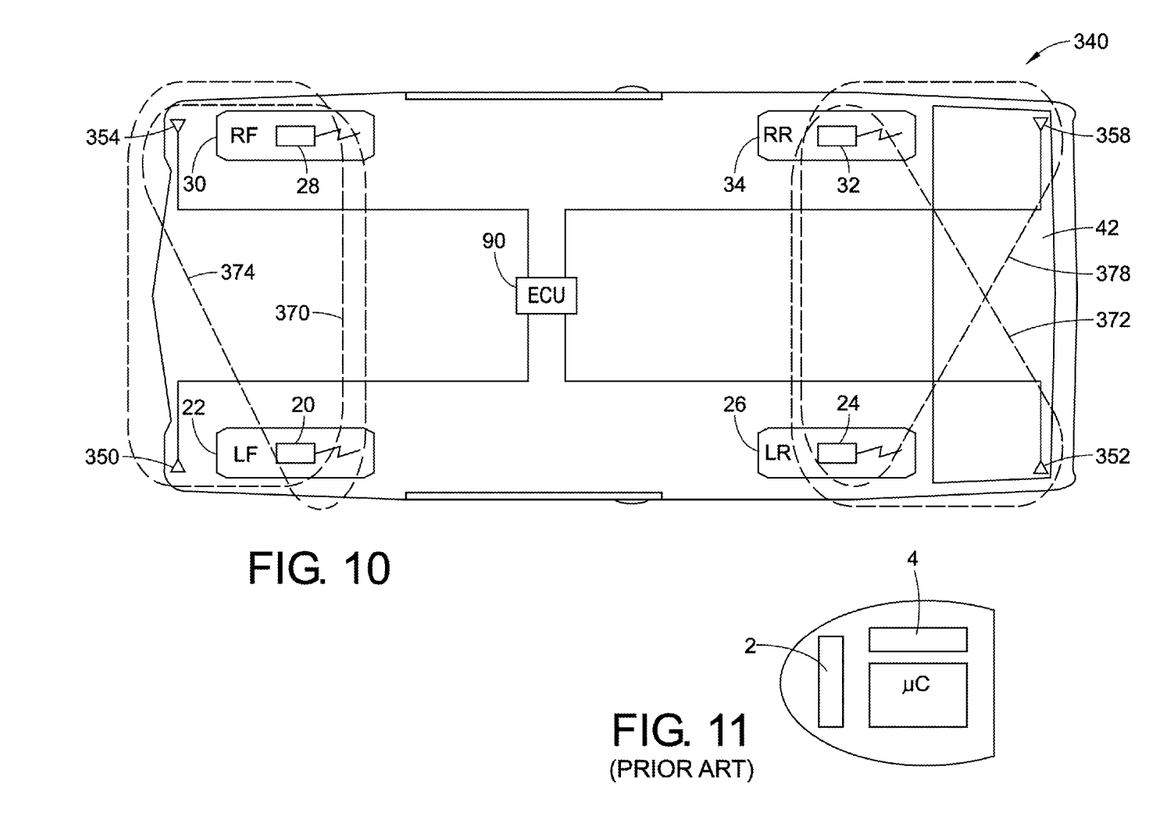
FIG. 10 is another schematic view of a vehicle including an SMART entry system and a tire pressure monitoring system ("TPMS").
FIG. 11 is a schematic depiction of the LF antenna layout for a known TPMS sensor.

One known TPMS sensor available from TRW Automotive includes two LF coils transversely mounted on a printed circuit board ("PCB") used for reception of LF commands from an on-vehicle mounted antenna, which is mounted in the wheel well, or from an external device such as registration equipment or a service tool at dealerships. The orientation of the LF coils on the PCB is shown in FIG. 11. The vertically-oriented coil 2 in FIG. 11 is used for normal LF reception from the vehicle mounted antennas, which is believed to be about 99% of its use. The second horizontally-oriented coil 4 in FIG. 11 does have some benefit for static LF transmissions as well, which is most important for the auto-learn sequences; however, the second coil 4 is not optimized for LF reception from the vehicle mounted antennas.

SUMMARY

An example of a vehicle entry/tire pressure management system that can overcome at least one of the aforementioned shortcomings includes a left front tire sensor, a left rear tire sensor, a right front tire sensor, a right rear tire sensor, a first low frequency ("LF") antenna, a second LF antenna, a third LF antenna, a fourth LF antenna, and an ECU. Each tire sensor is mounted in a respective tire of the vehicle. Each LF antenna is mounted on the vehicle and is configured to transmit an LF field to wake up two of the tire sensors. Two of the LF antennas can also be configured to transmit a SMART entry LF search field to wake up a portable transmission/reception unit for keyless entry of the vehicle. The ECU is in communication with the tire sensors, via a receiver, and the LF antennas. The ECU is configured to receive identification signals from the respective tire sensors and to determine locations of the respective tire sensors based on which antenna woke up the tire sensor transmitting the respective identification signal and whether the respective identification signal matches other received identification signals.

A method of localizing tire sensors on a vehicle to present data to an operator of the vehicle includes transmitting an LF tire sensor wake up signal from four tire antennas to wake up tire sensors located in tires on the vehicle. Each antenna is configured and positioned on the vehicle with respect to the tire sensors to transmit its respective tire sensor wake up signal to wake up two tire sensors. Three of the antennas are also configured to transmit an LF fob wake up signal to wake up a portable transmission/reception unit for keyless entry of the vehicle. In response to receiving the tire sensor wake up signals, the method of localizing tire sensors further includes transmitting RF signals including an identification signal from tire sensors to an RF receiver on the vehicle. The method further includes receiving the RF signals including the identification signal via the RF receiver into the ECU and comparing the received identification signals. The method further includes determining locations of the respective tire sensors based on which antenna woke up the tire sensor transmitting the respective identification signal and whether the received respective identification signal matches other received identification signals. The method further includes presenting tire data on a display at ignition ON and prior to movement of the tires based on the received RF signals and the determined locations of the respective tire sensors.

Another example of a vehicle entry/tire pressure monitoring system for a vehicle that can overcome at least one of the aforementioned shortcomings includes an ECU, tire sensors mounted in, on or adjacent respective tires of the vehicle, a portable transmission/reception unit configured to be carried by an operator of the vehicle, and an antenna mounted on the vehicle and in communication with the ECU. Each tire sensor is configured to transmit an RF signal. The portable transmission/reception unit can transmit RF signals for controlling operations of the vehicle including unlocking doors of the vehicle. The antenna is configured to transmit an LF tire sensor wake up field to wake up the tire sensors. The tire sensor wake up field includes a unique header format. The tire sensors only fully wake up upon receiving the unique header format.

A method for operating a vehicle entry/tire pressure monitoring system includes transmitting an LF field from an antenna mounted on a vehicle. The LF field includes a unique header format. The method further includes partially waking up a tire sensor to process the unique header format and partially waking up a portable transmission/reception unit to process the unique header format. The tire sensor is disposed in a tire of the vehicle. The portable transmission/reception unit communicates with an ECU on the vehicle to control operations of the vehicle. Where the unique header format matches a tire pressure sensor wake up header, the method for operating a vehicle entry/tire pressure monitoring system also includes fully awakening the tire sensor. Where the unique header format data matches a portable transmission/reception unit wake up header, the method further includes fully awakening the portable transmission/reception unit.

Another example of a vehicle entry/tire pressure monitoring system for a vehicle that can overcome at least some of the aforementioned shortcomings includes an ECU, LF antennas mounted on the vehicle and being in communication with the ECU, and tire sensors mounted in, on or adjacent respective tires of the vehicle. Each LF antenna is configured to transmit an LF tire sensor wake up field and a SMART entry LF search field to wake up a portable transmission/reception unit for keyless entry of the vehicle tire sensor. Each tire sensor includes a two-axis receiver antenna and an RF transmitter configured to transmit an RF signal. Each two-axis receiver antenna is configured such that a first axis of the two-axis antenna is configured to detect a respective LF field transmitted by one of the LF antennas and a second axis of the two-axis antenna is configured to detect a respective LF field transmitted by another of the LF antennas.

Another example of a vehicle system that can overcome at least one of the aforementioned shortcomings includes tire sensors mounted in, on or adjacent respective tires of the vehicle, LF antennas mounted on the vehicle, an RF receiver mounted on the vehicle, a memory and an ECU. Each tire sensor is configured to transmit an RF signal, which includes an identification signal associated with the respective tire sensor, and to detect an LF field. Each antenna is configured to transmit an LF field to wake up two tire sensors. The RF receiver is configured to receive the RF signals from the tire sensors after the tire sensors have awakened. The ECU is in communication with the antennas, the receiver and the memory. The ECU is configured to receive the identification signals from the tire sensors via the receiver. The ECU is further configured to determine locations of the respective tire sensors based on which antenna woke up the tire sensor transmitting the respective identification signal and whether the identification signal matches other received identification signals. The ECU is further configured to store the identification signals in the memory with the identification signals being associated with the respective tire sensors that transmitted the identification signal.

Another example of a method of localizing tire sensors on a vehicle to present data to an operator of the vehicle includes transmitting an LF tire sensor wake up signal from four tire antennas to wake up tire sensors located in tires on the vehicle. Each antenna is configured and positioned on the vehicle with respect to the tire sensors to transmit its respective tire sensor wake up signal to wake up two tire sensors. In response to receiving the tire sensor wake up signals, the method of localizing tire sensors further includes transmitting RF signals including an identification signal from tire sensors to an RF receiver on the vehicle. The method further includes receiving the RF signals including the identification signal via the RF receiver into the ECU and comparing the received identification signals. The method further includes determining locations of the respective tire sensors based on which antenna woke up the tire sensor transmitting the respective identification signal and whether the received respective identification signal matches other received identification signals. The method further includes presenting tire data on a display at ignition ON and prior to movement of the tires based on the received RF signals and the determined locations of the respective tire sensors. To aid in localizing the tire sensors, the method can further include memorizing the identification signals by storing the identification signal and the corresponding tire sensor in a memory that is in communication with the ECU.

Another example of a tire pressure monitoring system that can overcome at least one of the aforementioned shortcomings includes tire sensors mounted in, on or adjacent respective tires of the vehicle, LF antennas mounted on the vehicle, and an ECU. Each tire sensor is configured to transmit an RF signal and to detect an LF field. Each antenna is configured to transmit an LF wake up field to wake up respective tire sensors. The ECU is in communication with the antenna, the tire sensors and a radio configured to receive AM broadcast signals. The ECU can communicate with the radio to inhibit speakers in communication with the radio from emitting sound while each LF wake up field is being transmitted. The ECU can be configured to randomly send signals to the LF antennas to transmit respective tire sensor wake up fields.

A method for operating a tire pressure monitoring system on a vehicle having a radio includes transmitting an LF tire sensor wake up field to wake up tire sensors. The tire sensors are disposed within tires mounted on the vehicle. The method further includes inhibiting sound from being emitted from speakers receiving signals from a vehicle radio while transmitting the LF tire sensor wake up field. The method could also or alternatively include randomly transmitting LF tire sensor wake up fields to wake up tire sensors disposed within tires mounted on a vehicle.

Another example of vehicle system that can overcome at least some of the aforementioned shortcomings includes tire sensors mounted in, on or adjacent respective tires of the vehicle, LF antennas including a door-mounted antenna on a door of the vehicle, a receiver mounted on the vehicle, a door switch associated with the door having the door-mounted antenna mounted thereto, and an ECU in communication with the antennas, the receiver and the door switch. Each tire sensor is configured to transmit a signal and to detect an LF field. Each LF antenna is configured to transmit an LF tire sensor wake up field to wake up respective tire sensors. The receiver is configured to receive signals transmitted from the tire sensors. The door switch is configured for determining whether the door is open. The ECU is configured to receive identification signals from the respective tire sensors via the RF receiver. The ECU is further configured to determine locations of the respective tire sensors based on which antenna woke up the tire sensor transmitting the respective identification signal and whether the respective identification signal matches other received identification signals. The ECU is further configured to: (1) disregard signals from the tire sensors woken up by the door-mounted antenna when the door was open or (2) inhibit the door-mounted LF antenna from transmitting the LF field to wake up the tire sensors when the door is open.

Another example of a method for operating a vehicle system includes receiving a signal to transmit an LF field from a door-mounted LF antenna to wake up tire sensors disposed within tires mounted on a vehicle, and determining whether a door, to which the door-mounted LF antenna is mounted, is open. Where the door is open, the method for operating can further include disregarding the received signal to transmit the LF field. Where the door is closed, the method for operating can further include transmitting the LF field from the door-mounted LF antenna.

Another example of a method for operating a vehicle system includes transmitting an LF tire sensor wake up field from four antennas including a door-mounted LF antenna to wake up tire sensors located in tires on the vehicle and determining whether a door, to which the door-mounted LF antenna is mounted, is open. The method further includes in response to detecting the tire sensor wake up fields by respective tire sensors, transmitting signals including an identification signal from the tire sensors to a receiver on the vehicle. Where the door is open, the method can include disregarding the received signal from the respective tire sensors awakened by the door-mounted antenna. Where the door is closed, the method can further include receiving the respective signal including the respective identification signal from the respective tire sensors awakened by the door mounted-mounted antenna.

Another method for localizing tire sensors includes determining a wake up field power, transmitting an LF wake up field having the wake up field power from an LF antenna on the vehicle, receiving an identification signal from each tire sensor awakened by the transmitted LF wake up field, and determining whether a desired number of tire sensors have woken up in response to the transmitted LF wake up field based on the received identification signals. When the desired number of tire sensors have woken up, the method can further include recording the identification signals received from the awakened tire sensors and the respective antennas that awoke the respective tire sensors. The method further includes determining whether a desired number of antennas have transmitted a respective LF wake up field. When the desired number of antennas have transmitted a respective LF wake up field, the method can further include comparing the received identification signals and determining locations for the tire sensors based on which respective antenna woke up which respective tire sensor and whether the received identification signals match other received identification signals.

DETAILED DESCRIPTION

Throughout the specification and claims, the following terms take the meanings explicitly associated herein, unless the context clearly dictates otherwise. As used herein, the term "or" is an inclusive "or" operator, and is equivalent to the term "and/or" unless the context clearly dictates otherwise. The term "based on" is not exclusive and allows for being based on additional factors not described, unless the context clearly dictates otherwise. In addition, throughout the specification and claims, the meaning of "a," "an," and "the" include plural references. Moreover, reciting a number of components, e.g. "three antennas," does not preclude the use of more than three components, and unless the context clearly dictates otherwise, the recitation of a certain number of components should be construed as a minimum number of components. The descriptions and drawings herein are merely illustrative and various modifications and changes can be made in the structures and steps disclosed without departing from the present disclosure. Various identified components of a vehicle disclosed herein are merely terms of art and may vary from one vehicle manufacturer to another. The terms should not be deemed to limit the present disclosure. The drawings are shown for purposes of illustrating one or more exemplary embodiments and are not for purposes of limiting the appended claims. All references to direction and position, unless otherwise indicated, refer to the orientation of the vehicle components illustrated in the drawings and should not be construed as limiting the appended claims.

Figure 1:
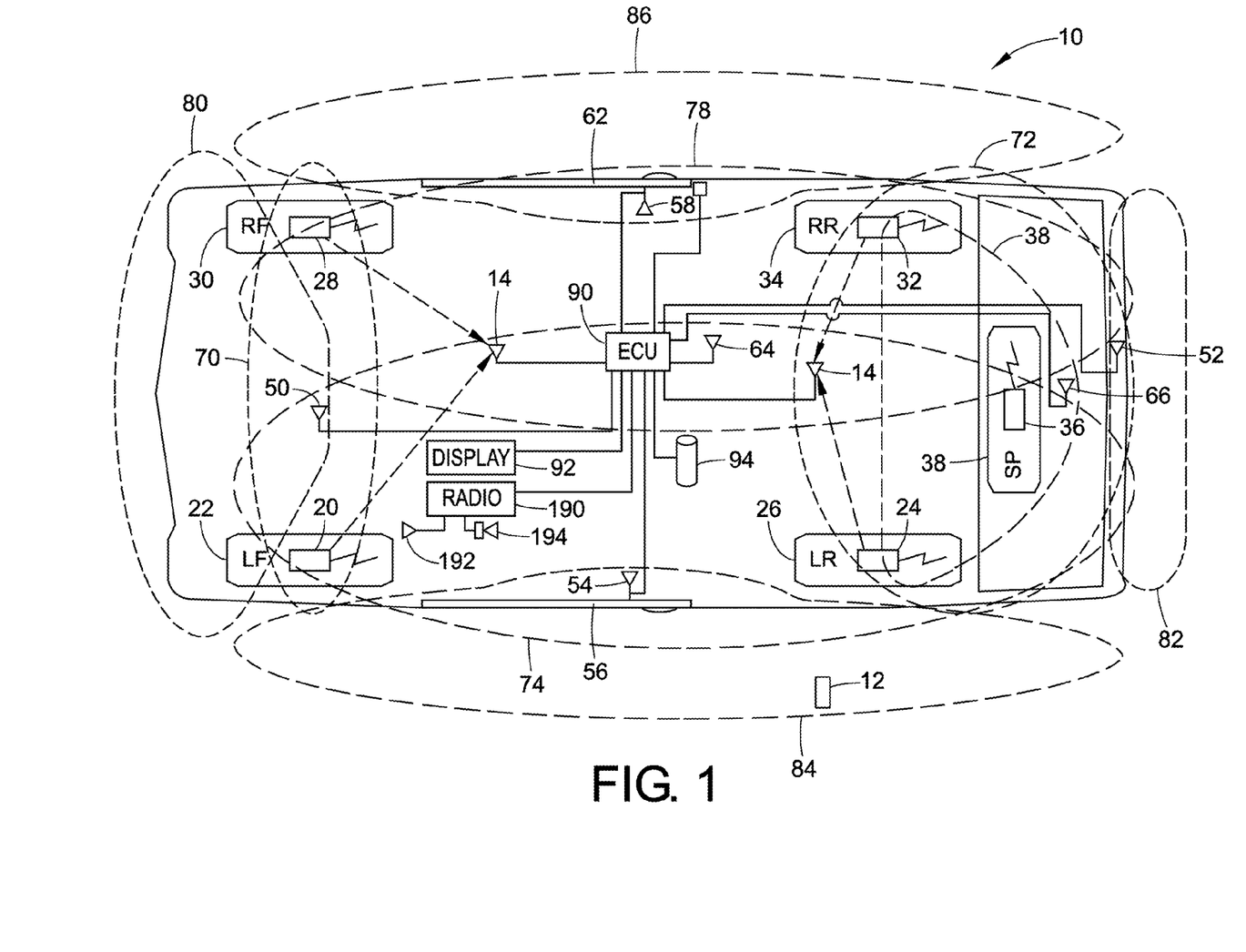
FIG. 1 is a schematic view of a vehicle including an SMART entry system and a tire pressure monitoring system ("TPMS").

With reference to FIG. 1, a vehicle 10 including a vehicle entry/tire pressure monitoring system is shown. In this SMART entry system, an operator of the vehicle carries a portable transmission/reception unit 12, hereinafter referred to as a fob, that transmits signals to an RF receiver 14 (two are shown in FIG. 1) found on the vehicle 10 to operate certain systems of the vehicle including door locks as well as turning the ignition ON. The fob 12, which could be any device capable of receiving and sending wireless signals, is woken up by detecting an LF field, and in response to detecting the LF field transmits an RF signal to the RF receiver 14. The fob 12 detects an LF wake-up signal, e.g. an LF signal at about 125 KHz, and transmits reply signals to the receiver, e.g. a reply signal at about 315 MHz. The frequencies discussed herein are merely examples, and the system can operate at other frequencies.

For vehicles that include SMART entry and TPMS, efficiencies can be achieved by combining components of these once separate systems. With continued reference to FIG. 1, the TPMS portion of a vehicle entry/TPMS includes a left front tire sensor 20 installed in a left front tire 22 of the vehicle 10, a rear left tire sensor 24 installed in a rear left tire 26 of the vehicle, a right front tire sensor 28 installed in a right front tire 30 of the vehicle and a right rear tire sensor 32 installed in a right rear tire 34 of the vehicle. A spare tire sensor 36 can be installed in a spare tire 38, which can be typically located in a trunk 42 of the vehicle 10. Each tire sensor can be configured to take air pressure measurements for the respective tire. Each tire sensor can also measure the air temperature inside the respective tire. Additionally, each tire sensor can include an accelerometer to determine wheel direction, and therefore, direction of rotation, which can allow for a determination of which side of the vehicle the wheel is on. Each tire sensor can also supply vehicle loading information. This data can be sent to the RF receiver 14 via RF signals transmitted from the respective tire sensors. The vehicle 10 and the vehicle entry/TPMS can also include a front low frequency ("LF") antenna 50 mounted towards a front of the vehicle 10 (e.g., in the engine room), a rear LF antenna 52 mounted towards a rear of the vehicle (e.g., on the rear bumper), a left side LF antenna 54 mounted adjacent, in or on a left door 56 of the vehicle, and a right side antenna 58 mounted adjacent, in or on a right door 62 of the vehicle. The vehicle 10 can also include a cabin LF antenna 64 and a trunk LF antenna 66.

The front antenna 50 is configured to transmit a front LF field 70 to wake up the front tire sensors 20, 28. The rear LF antenna 52 is configured to transmit a rear LF field 72 to wake up the rear tire sensors 24, 32. The rear LF field 72 generated by the rear LF antenna 52 can also be large enough to wake up the spare tire sensor 36 on the spare tire 38, which can be located in the trunk 42 or rear of the vehicle 10. The left side antenna 54 is configured to transmit a left LF field 74 to wake up the left tire sensors 20, 24. The right side LF antenna is configured to transmit a right LF field 78 to wake up the right tire sensors 28, 32. The left LF field 74 and the right LF field 78 can also be large, or powerful, enough to wake up the spare tire sensor 36. Each of the wake up fields can be about 125 KHz.

As was explained above, it can be desirable to combine components of a TPMS with components of a vehicle entry system such as a SMART system. In view of this, the front antenna 50 can be configured to transmit a front SMART entry LF search field 80 to wake up the fob 12. The rear antenna 52 can be configured to transmit a rear SMART entry LF search field 82 to wake up the fob 12. The side antennas 54 and 58 can also be configured to transmit a SMART entry LF search field 84, 86 respectively, to wake up the fob 12, for example for receiving signals for keyless entry of the vehicle. Similarly, the cabin LF antenna 64 and the trunk LF antenna 66 can also be configured to transmit SMART entry LF search fields (not shown) to wake up the fob 12. If desired, the trunk LF antenna 66 can also transmit a wake up search field to wake up the spare tire sensor 36, as well as the left rear tire sensor 24 and the right rear tire sensor 32. These SMART entry search fields can be about 125 KHz. The search fields and/or wake up fields depicted in FIG. 1 are merely exemplary and can take other configurations.

The antennas 50, 52, 54 and 58 that are used to wake up the tire sensors 20, 24, 28 and 32 can also be used to detect for the fob 12 when an operator of the vehicle 10 is approaching the vehicle and the cabin 64 and trunk 66 LF antennas can also be used to detect whether the fob is within the vehicle. The antennas 52, 54 and 58, as well as the front antenna 50 if desired, in the embodiment depicted in FIG. 1 serve a dual purpose of waking up the tire sensors 20, 24, 28 and 32 in addition to polling for the fob 12: Unlike many known TPMS systems, the antennas 50, 52, 54 and 58 that wake up the tire sensors 20, 24, 28 and 32 are not located in the wheel wells, but instead are spaced from the wheel wells. The front antenna 50 and the rear antenna 52 can be generally centrally located with respect to the outboard sides of the vehicle 10.

The vehicle entry/TPMS also includes an ECU 90 in communication with the tire sensors 20, 24, 28, 32 via the RF receiver 14 and the LF antennas 50, 52, 54 and 58. The ECU 90 is configured to receive unique identification signals from the respective tire sensors and to determine locations of the respective tire sensors based on which antenna woke up the tire sensor transmitting the respective unique identification signal and whether the respective unique identification signal matches other received unique identification signals. This allows the ECU 90 to determine which sensor is providing data to the ECU so that the ECU can present the appropriate data to the operator of the vehicle on a display 92 that is also in communication with the ECU.

Figure 2:
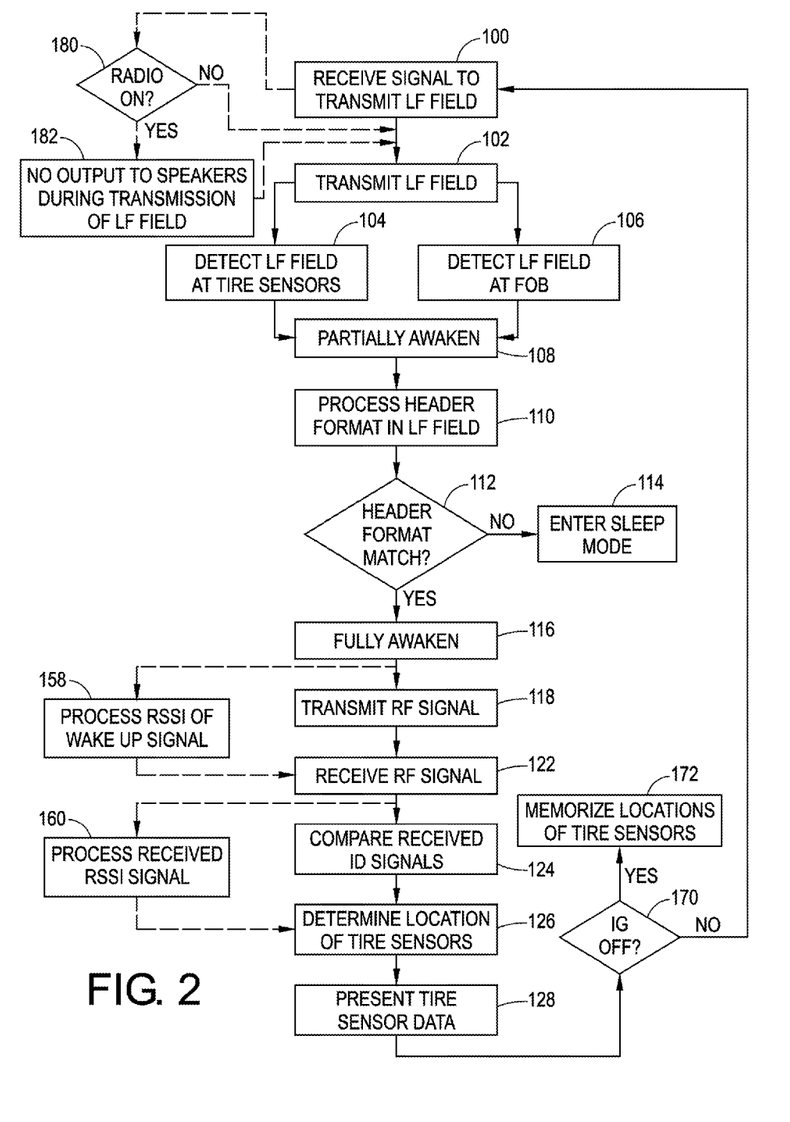
FIG. 2 is a flow diagram depicting a method of operating a vehicle entry/tire pressure monitoring system, which can include a method of localizing tire sensors on a vehicle.

FIG. 2 depicts a method for operating a vehicle entry/tire pressure monitoring system, which can also include a method for localizing tire sensors on the vehicle to present data to an operator of the vehicle. Even though steps of the method are presented in a logical order in FIG. 2, unless otherwise noted in the appended claims, the appended claims should not be limited to the order presented in FIG. 2 or in any of the figures presented herein. At 100, a signal is received to transmit an LF field from the antennas 50, 52, 54 and 58. The signal to transmit the LF field can occur in response to receiving a signal from the fob 12, which can allow for the presentation of tire pressure data on the display 92 at or nearly instantaneously after an ignition for the vehicle 10 is turned ON. Accordingly, prior to the operator ever moving the wheels 22, 26, 30 and 34 of the vehicle 10, tire pressure data can be presented on the display 92. The signal to transmit the LF field can also be generated by the ECU 90, for example while the vehicle 10 is moving, the ECU can detect the tire pressure of the tires without receiving any signal from the fob 12.

Figure 3:
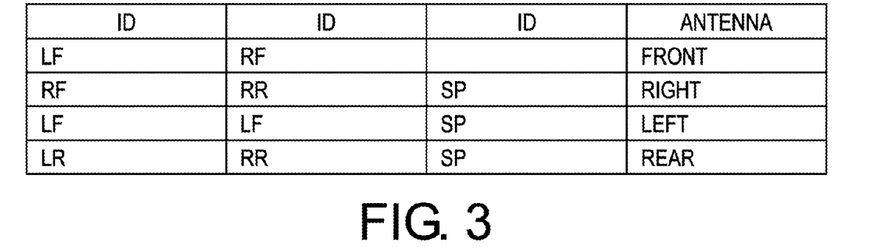
FIG. 3 is a schematic depicting data stored in a memory of the system shown in FIG. 1.

At 102, LF tire sensor wake up fields, also referred to as tire sensor wake up signals, 70, 72, 74 and 78 are transmitted from the respective antennas 50, 52, 54 and 58 to wake up tire sensors 20, 24, 28 and 32 located in tires 22, 26, 30 and 34 on the vehicle 10. Each LF field can be transmitted sequentially to allow the respective awakened tire sensors 20, 24, 28 and 32 to send reply RF signals, which include an identification signal that is unique to each tire sensor, to the RF receiver 14 so that the ECU 90 can record which antenna woke up the respective tire sensor transmitting the identification signal. The RF signals transmitted by each tire sensor can be at around 315 MHz, although the reply signal could be at another frequency. An example of a table that could be used to determine which antenna woke up a respective tire sensor transmitting an identification signal is shown in FIG. 3. This data that has been received by the ECU 90 can be stored in a memory 94 (FIG. 1) that is also in communication with the ECU. In FIG. 3, "ID" refers to the unique identification signal that was received by the ECU 90, "LF," "LR," "RF," "RR," and "SP" refer to the respective unique identifications for each of the tire sensors, "ANTENNA" refers to the antennas 50, 52, 54 and 58, and "FRONT," "RIGHT," "LEFT" and "REAR" refers to each antenna, respectively.

With reference back to FIG. 2, at 104, the tire sensors 20, 24, 28 and 32 detect the LF fields 70, 72, 74 and 78 transmitted by the respective antennas 50, 52, 54 and 58. Since the fob 12 is also is capable of detecting LF fields, at 106, the LF field is also detected at the fob 12. To conserve power consumption and battery life for each of the tire sensors 20, 24, 28 and 32 and the fob 12, the tire sensor wake up fields 70, 72, 74 and 78 can include a unique header format.

At 108, each of the tire sensors 20, 24, 28 and 32 can partially awaken to process the unique header format upon receiving the LF field. Similarly, at 108, the fob 12 can also partially awaken to process the unique header format. The unique header format is processed at 110 in the tire sensors 20, 24, 28 and 32 and in the fob 12 if the fob is located within the LF field.

A determination is made, at 112, whether the header format in the LF field matches. If the LF field transmitted by any of the antennas 50, 52, 54 or 58 is for waking up a respective tire sensor, then the unique header format would match a predetermined header format that would be required to fully awaken the tire sensors 20, 24, 28 and 32. However, if the LF field transmitted by any of the antennas 50, 52, 54 or 58 was to wake up the tire sensors 20, 24, 28 and 32, then the fob 12 would also partially awake to process this unique header format; however, the fob would enter a sleep mode, at 114, upon determining that the unique header format in the LF tire sensor wake up field does not match a predetermined header format required to wake-up the fob. Accordingly, no return signal to the RF receiver is transmitted in response to receiving a tire sensor wake up signal by the fob 12. By only awakening to process the unique header format, and going to sleep if the unique header format does not match a predetermined header format, power consumption for the fob 12 can be reduced and battery life can be increased. In a similar manner, if one of the antennas 50, 52, 54 or 58 were to transmit a SMART entry search field, this SMART entry search field would include a unique header format that would only fully awaken the fob 12 and would not fully awaken the tire sensors. Accordingly, the tire sensors would simply partially awake to process the unique header format, at 110, determine that the unique header format does not match, at 112, and since the unique header format was for a SMART entry polling, as opposed to wake up the tire sensors, the tire sensors would then enter back into a sleep mode, at 114, thus conserving power and battery life. Moreover, in the illustrated example, the tire sensors take pressure readings of the tires and transmit the RF signals only when fully awake, thus conserving power.

Where the header format matches the predetermined header format, at 112, then the tire sensors 20, 24, 28 and 32 fully awaken at 116. At 118, RF Signals including a unique identification signal are transmitted from the tire sensors 20, 24, 28 and 32. At 122, the RF signals including each unique identification signal is received at the receiver 14 (FIG. 1). At 124, the received unique identification signals are compared, for example by using the table similar to that shown in FIG. 3. At 126, locations for each tire sensor are determined based on which antenna woke up the tire sensor transmitting the respective unique identification signal and whether the respective unique identification signal matches other received unique identification signals. As seen in FIG. 3, since the unique identification LF was found in a reply signal after being awakened by both the front antenna 50 and the left side antenna 54 and the front LF field 70 and the left LF field 74 overlap, the unique identification signal associated with "LF" in the table at FIG. 3 can be determined to be associated with the left front tire sensor 20. This can be performed for each of the signals received in response to each of the wake up signals.

At 128, tire sensor data can be presented on the display 92. With the embodiment depicted in FIG. 2, the tire sensor data can be presented on the display at ignition ON, which should be construed as nearly instantaneously after ignition ON, and prior to movement of the tires 22, 26, 30 and 34 based on the RF signals received from the respective tire sensors and the determined locations of the respective tire sensors.

As mentioned above, it can be desirable to provide tire pressure data at ignition ON on the display 92. Presenting the data at ignition ON should also be construed as presenting the data nearly instantaneously after ignition ON, e.g. allowing enough time for the system, including the display 92 and the ECU 90 to boot up and process the signals. Accordingly, it is desirable to locate the tire sensors prior to moving the tires. However, since each tire sensor can be located in nearly an infinite number of locations with respect to the antenna that is to wake up the respective tire sensor (because the sensor is fixed to the tire, which rotates), the exemplary vehicle entry/tire pressure monitoring system employs four antennas (although more could be provided) to increase the likelihood of awakening each tire sensor with at least one of the LF wake up fields being provided by the respective antennas.

For example, with reference back to FIG. 1, the left side antenna 54 can mount to a left side sill (not shown) of the vehicle 10 beneath the left door 56, on the left door 56 or on the vehicle body near the left door. Since the left side LF antenna is also used to pole for the fob 12, it is desirable to locate the left side LF antenna near the left door so that an operator of the vehicle approaching the left door is able to send a signal to the RF receiver 14, via the fob 12, to unlock the door after having been awakened by the left side LF antenna. Similarly, the right side LF antenna 58 can be mounted to a right side sill of the vehicle beneath the right door 62, to the right door, or to the frame or vehicle body near the right door. Since the antennas 54 and 58 are removed from the typical location of within the wheel well, awakening the left side and right side sensors with each of the antennas can present issues.

In the embodiment illustrated in FIG. 2 each tire sensor 20, 24, 28 and 32 and each side antenna 54 and 58 are configured such that each tire sensor has at least about an 80% chance of being woken up by the left LF field 74 or the right LF field 78. Again, this is because since each of the wheels rotate and each of the tire sensors is fixed to each of the wheels the location of the tire sensor with respect to the side antennas 54 and 58 can change. This makes detection of each tire sensor more difficult as compared to with an antenna located in the wheel well used to wake up the respective tire sensor. To increase the likelihood of waking up each of the tire sensors, the front LF antenna 50 and the rear LF antenna 52 are provided. Since these antennas transmit respective LF fields 70 and 72 that overlap the side LF fields 74 and 78, the likelihood of waking up each of the tire sensors is increased. Accordingly, each tire sensor 20, 24, 28 and 32, the front antenna 50, and the rear antenna 52 are configured, in combination with the side antennas 54 and 58, such that each tire sensor has at least about a 95% chance of being waken up by the front LF field 70, the rear LF field 72, the left LF field 74, and the fight LF field 78.

There may be times when one of the antennas only awakens one tire sensor or no tire sensors. In order to provide localization of the tires at ignition ON, further measures can be taken.

Figure 4:
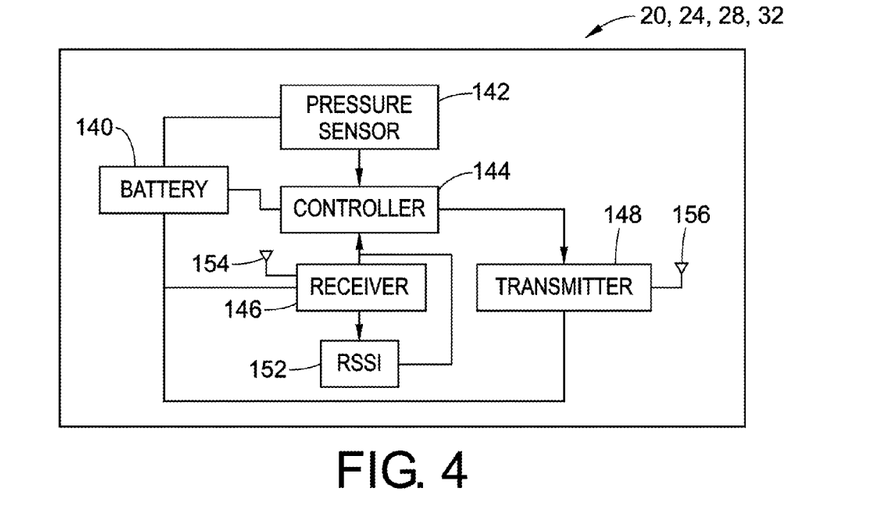
FIG. 4 is a schematic view of a tire sensor depicted in FIG. 1.

FIG. 4 schematically depicts each tire sensor 20, 24, 28 and 32. Each tire sensor generally includes a power source or battery 140. The battery 140 provides power to a parameter sensor, such as a pressure sensor 142, a tire sensor controller 144, a receiver 146 and a transmitter 148. If desired, the receiver 146 and transmitter 148 can be combined in a transceiver. Each tire sensor also includes a received signal strength indication ("RSSI") circuit 152, which can further aid in localization of the tire sensors. The receiver 146 includes an antenna 154 that is configured to detect an LF field. The RSSI circuit 152 generates RSSI data that is a function of radiated power from respective LF fields being picked up by the receiving antenna 154. The transmitter 148 can also include an antenna 156 that is configured to transmit an RF signal.

Localizing the tire sensors 20, 24, 28 and 32 using RSSI data can follow much of the same process described above with reference to FIG. 2. Accordingly, when the tire sensor is fully awakened, at 116, the LF field received through the antenna 154 and the receiver 146 can be processed, at 158, by the RSSI circuit 152 on the tire sensor to determine the signal strength of the LF field. Each tire sensor can then transmit an RF signal, including the RSSI data, via the transmitter 148 and the antenna 156, at 118, back to the RF receiver 14 on the vehicle (118 in FIG. 2). At 122 in FIG. 2, the RF signal including the RSSI data is received at the RF receiver 14 and the RSSI data can be processed, at 160, to determine locations of the respective tires based on the RSSI data. For example, front antenna 50 can be located nearer the left front tire sensor 20 as compared to the right front tire sensor 28. Accordingly, the LF field picked up by the left front tire sensor 20 should be greater than the LF field picked up by the right front tire sensor 28. Accordingly, the RSSI data can further provide indications with regard to location of the respective tire sensors. The RSSI data can be used in addition to the unique identifications, described above, to locate the tire sensors. Accordingly, if one of the antennas fails to wake up a respective tire sensor, e.g. one of the blocks in the table shown in FIG. 3 is missing, the RSSI data can be used to determine which sensors have sent signals to the receiver 14.

Figure 5:
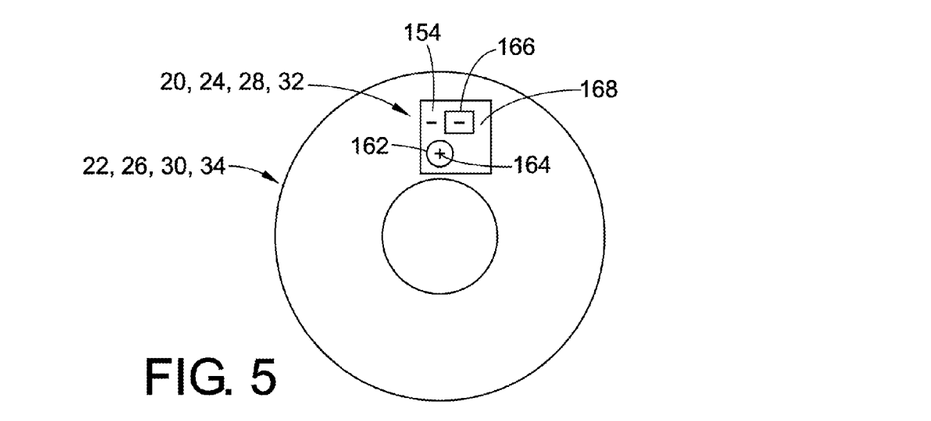
FIG. 5. is a schematic view of the tire sensor and a tire depicted in FIG. 1.

As mentioned above, each tire sensor and each side antenna 54, 58 are configured such that each tire sensor can have about an 80% chance of being woken up by the left LF field 74 or the right LF field 78 when the tires are not moving. To increase the likelihood that each tire sensor is woken up by a side antenna (the left side antenna 54 or the right side antenna 58) or a centrally located antenna (the front antenna 50 or the rear antenna 52), as seen in FIG. 5, the receiving antenna 154 can be a two-axis antenna, which increases the likelihood of picking up an LF field, as compared to a standard one-axis antenna.

The two-axis receiver antenna 154 can include a first coil 162 wrapped around a first axis 164 and a second coil 166 wrapped around a second axis 168. The first coil 162 and the first coil axis 164 are arranged to optimize the likelihood of detecting the LF field generated from either the front antenna 50 or the rear antenna 52 depending on the location of the tire sensor, i.e., whether the tire sensor is a front tire sensor or a rear tire sensor. As seen in FIG. 1, the front antenna 50 and the rear antenna 52 can be located nearer a longitudinal centerline of the vehicle 10 as compared to an outboard side of the vehicle. The first coil axis 164 can be arranged in a plane that is normal to a second plane, which is normal to a rotational axis of the tire carrying the tire sensor. This allows the first axis 164 to align generally with the rotational axis of the wheel, although the axis may be offset from the rotational axis because of mounting constraints within the tire as well as to optimize the likelihood of detecting the LF field being generated from either the front antenna 50 or the rear antenna 52. Accordingly, the first axis 164 can be arranged generally transverse to the longitudinal centerline of the vehicle 10. The second coil 166 and the second coil axis 168 are arranged to optimize the likelihood of detecting the LF field generated from either side antenna 54 or 58 depending on the location of the tire sensor, i.e. whether the tire sensor is a left tire sensor or a right tire sensor. As seen in FIG. 1, the side antennas 54 and 58 are located nearer the outboard side of the vehicle as compared to the longitudinal centerline of the vehicle 10. The second coil axis 168 can be arranged in the second plane, which was described above as generally normal to the rotational axis of the tire carrying the tire sensor. This allows the second axis 168 to align generally with the traveling or longitudinal direction of the vehicle 10, although the axis may be offset from the longitudinal axis because of mounting constraints within the tire as well as to optimize the likelihood of detecting the LF field being generated from either the left antenna 54 or the right antenna 58. Accordingly, the second axis 168 can be arranged generally parallel with the longitudinal centerline of the vehicle 10. As also explained above, each LF antenna, or at least one of the LF antennas, can be positioned closer to one of the two sensors that are to be awakened by the LF field generated by the LF antenna. The ECU is then configured to determine locations of the respective tires based on RSSI data from the RF signals being received from the tire sensors.

The ECU 90 can also store identification signals in the memory 94 with the identification signals being associated with the respective tire sensors, which can also aid in localization of the tire sensors. In the illustrated embodiment, the ECU 90 is configured to store the identification signals received from the tire sensors in the memory 94 in response to an ignition of the vehicle 10 being turned OFF. By storing the identification signals and associating the identification signals with respective tire sensors, at ignition OFF, should one of the tire sensors be undetectable when a wake up signal is being sent prior to ignition ON, the stored identification signals can be useful in localizing the tires. If the RF receiver 14 does not receive adequate data in the RF signal or does not receive an RF signal from enough of the tire sensors to determine locations for the tire sensors, then the display can present data associated with RF signals transmitted by the tire sensors in different manners. For example, the data presented on the display 92 can be presented in a first state where the RF signals sent from the respective tire sensors 20, 24, 28 and 32 provide sufficient data to the ECU 90 to determine a location for the respective sensor. This data can be presented, for example, in a non-blinking state. The data can be presented in a second state, e.g. blinking, when the ECU 90 is unable to determine a location for the tire sensor based on the received RF signals.

With reference back to FIG. 2, at 170, it can be determined whether the ignition for the vehicle has turned OFF. If the ignition for the vehicle 10 has turned OFF at 170, then at 172, the ECU can memorize the locations of the tire sensors by storing data in the memory 94 similar to the table shown in FIG. 3. If the ignition is not turned OFF at 170, then the process can revert to waiting to receive a signal to transmit an LF field, at 100, which can come from the fob 12 or the ECU 90. By memorizing the location of the tire sensors 20, 24, 28 and 32 at ignition OFF, assumptions can be made that the RF signals received from the respective tire sensors that include the ID signals will match the stored ID signals. For example, if not all of the antennas awakened each of the tire sensors assigned to a respective antenna, per the table shown in FIG. 3, but some of the received unique identification signals matched some of the stored unique identification signals, then localization of the tire sensors can be determined. If, however, the tires have been changed on the vehicle, this will not be the case and the localization of the tires will follow the process outlined in FIG. 2. However, if some (fewer than three or four) of the tire sensors sends back a signal that matches one stored in the memory, then the location of the tire pressure sensors can be determined based on matching stored identification signals associated with tire sensors and measurements can be made for the tires and presented to the operator on the display 92. Additionally, if a respective tire sensor does not detect an LF wake up field from two LF antennas, (perhaps the tire sensor only is awakened by only one LF antenna), then by using the data stored in the memory 94 the location for this tire sensor can be deduced by comparing the reply signals from other tire sensors and the respective antennas that awoke the other tire sensors.

With reference back to FIG. 1, the vehicle 10 can also include a radio 190 configured to receive AM broadcast signals via a receiver antenna 192. The LF antennas 50, 52, 54 and 58 transmit an LF field that can be picked up by the antenna 192. Accordingly, the ECU 90 communicates with the radio 190 to inhibit speakers 194 that are in communication with the radio 190 from emitting sound while the LF field to wake up the tire sensors 20, 24, 28 and 32 or the key fob 12 is being transmitted. The radio 190 can be configured to boot up in response to the radio being ON and the ignition of the car being ON. A time period for booting up the radio can be enlarged during transmission of the LF field to wake up the tire sensors. For example, at ignition ON a signal can be transmitted from the ECU 90 to the LF antennas 50, 52, 54 and 58 to transmit wake up fields to the respective tire sensors 20, 24, 28 and 32. A time period for booting up the radio can be enlarged during transmission of the LF field so that the antenna 192 for the radio 190 does not pick up the LF field resulting in undesirable output over the speakers 194.

Accordingly, a method for operating a tire pressure monitoring system and a vehicle radio can include transmitting an LF tire sensor wakeup field to wake up tire sensors disposed within tires mounted on a vehicle, and inhibiting sound from being emitted by speakers receiving signals from the vehicle radio while transmitting the wakeup field. With reference back to FIG. 2, at 100, the signal is received to transmit the LF field, either to wake up the tire sensors 20, 24, 28 and 32, or even to poll for the fob 12. At 180, it can be determined whether the radio is ON (or set to receive AM broadcast signals). If it is determined that the radio is ON (or set to receive AM broadcast signals), then no output from the radio 190 to the speakers 194 is permitted while the LF fields are being transmitted. The wake up or search process can then resume. If the radio is OFF (or not set to receive AM broadcast signals), then the process can resume and transmit LF fields at 102. Alternatively, the ECU 90 can receive communications from the radio 190, via a communication area network, stating that the radio was set to pick up AM broadcast signals and to output sound to the speakers 194. If the ECU detects the radio is set to AM mode, then LF fields transmitted by the antennas 50, 52, 54 and 58 can be randomly dispersed. In view of this, the system can further include a random number generator (not depicted in the figures, but can be located on hardware of the ECU or in software stored on the ECU) in communication with the ECU 90. The ECU 90 can be configured to randomly generate signals to the LF antennas 50, 52, 54 and 58 to transmit respective tire sensor wake up fields based on output received from the random number generator or other similar method known in the art. The random number generator can be a hardware random number generator or a software (pseudo) random number generator. If the LF wake up fields transmitted by the antennas 50, 52, 54 and 58 happen to be picked up by the receiver antenna 192 and were output to the speakers 194, the LF wake up fields would sound like random noise to the operator of the vehicle 10, which can be common while listening to AM radio.

As mentioned above, side antennas 54 and 58 can each mount to a respective door. Generating an LF field wakeup signal for the side tire sensors from an LF antenna on a door that is open could present problems in that the door antenna may not wake up the desired tire sensors due to its change in position with respect to the tire sensors. Such a situation can be accommodated by providing a door switch 208 (only one door switch is shown in FIG. 1, however, one door switch can be provided with each door or closure of the vehicle) that is in communication with the ECU 90.

Figure 6:
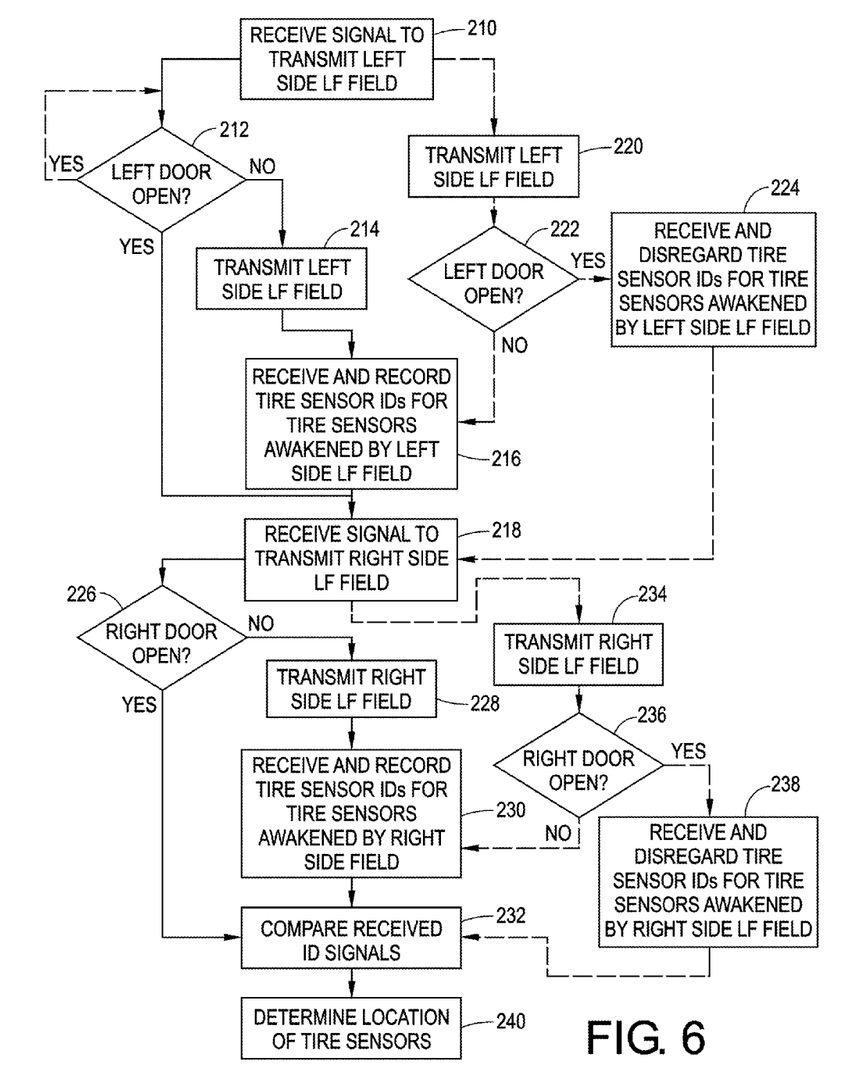
FIG. 6 is a flow diagram depicting another method for operating a vehicle entry/tire pressure monitoring system.

With reference to FIG. 6, at 210, a signal is received to transmit a left side LF field from the left LF antenna 54, which is mounted to the left door 56. It is at this stage where the process can follow two different paths. Along one path, a determination is made as to whether the left door is open, at 212. If the left door is not open, at 212, then, at 214, the left side LF field is transmitted and, at 216, the RF receiver 14 can receive the tire sensor unique identifications and the ECU 90 can record the tire sensor unique identifications for tire sensors awakened by the left side LF field. If it is determined, at 212, that the left door is open, then the ECU 90, which could receive the signal to transmit the left side LF field from the fob 12, disregards the received signal to transmit and moves on with the process to receiving a signal to transmit the right side LF field, at 218. Alternatively, upon receiving the signal to transmit the left side LF field, at 210, at 220, the left LF antenna 54 could transmit the left side LF field. Then a determination can be made, at 222, as to whether the left door 56 is open. If the left door is not open, at 222, then the process moves to 216 and receives and records tire sensor IDs for tire sensor awakened by the left side LF field. If the left door is open, at 222, then the RF receiver 14 can receive signals, at 224, from the tire sensors awakened by the left side LF field; however, any received tire sensor unique identifications are disregarded when the door is open.

A similar process is undertaken for the right LF antenna 58, which can be mounted to the right door 62 of the vehicle 10. At 218, a signal is received to transmit a right side LF field from the right LF antenna 58, which is mounted to the right door 62. Similar to above, it is at this stage where the process can follow two different paths. Along one path, a determination is made as to whether the right door is open, at 226. If the right door is not open, at 226, then, at 228, the right side LF field is transmitted and, at 230, the RF receiver 14 can receive the tire sensor unique identifications and the ECU 90 can record the tire sensor unique identifications for tire sensors awakened by the left side LF field. If it is determined, at 226, that the right door is open, then the ECU 90, which could receive the signal to transmit the right side LF field, disregards the received signal to transmit and moves on with the process to comparing received unique identification signals, at 232. Alternatively, upon receiving the signal to transmit the right side LF field, at 218, the right LF antenna 58 could transmit the right side LF field, at 234. Then a determination can be made, at 236, as to whether the right door 62 is open. If the right door is not open, at 236, then the process moves to 230 and receives and records tire sensor IDs for tire sensor awakened by the right side LF field. If the right door is open, at 236, then the RF receiver 14 can receive signals, at 238, from the tire sensors awakened by the right side LF field; however, any received tire sensor unique identifications are disregarded when the door is open and the process moves to compare received unique identification signals at 232 and determining locations of the tire sensors at 240, which has been described in detail above with reference to FIGS. 2 and 3. Alternatively, if it is detected that any of the doors are open during transmission of the LF wake up field from the opened door, the process could also loop back so that the wake up field could be re-transmitted when the door is closed. This is only shown with regard to step 212 in FIG. 6; however, the loop back procedure can apply to steps 222, 226 and 236 also.

Figure 7:
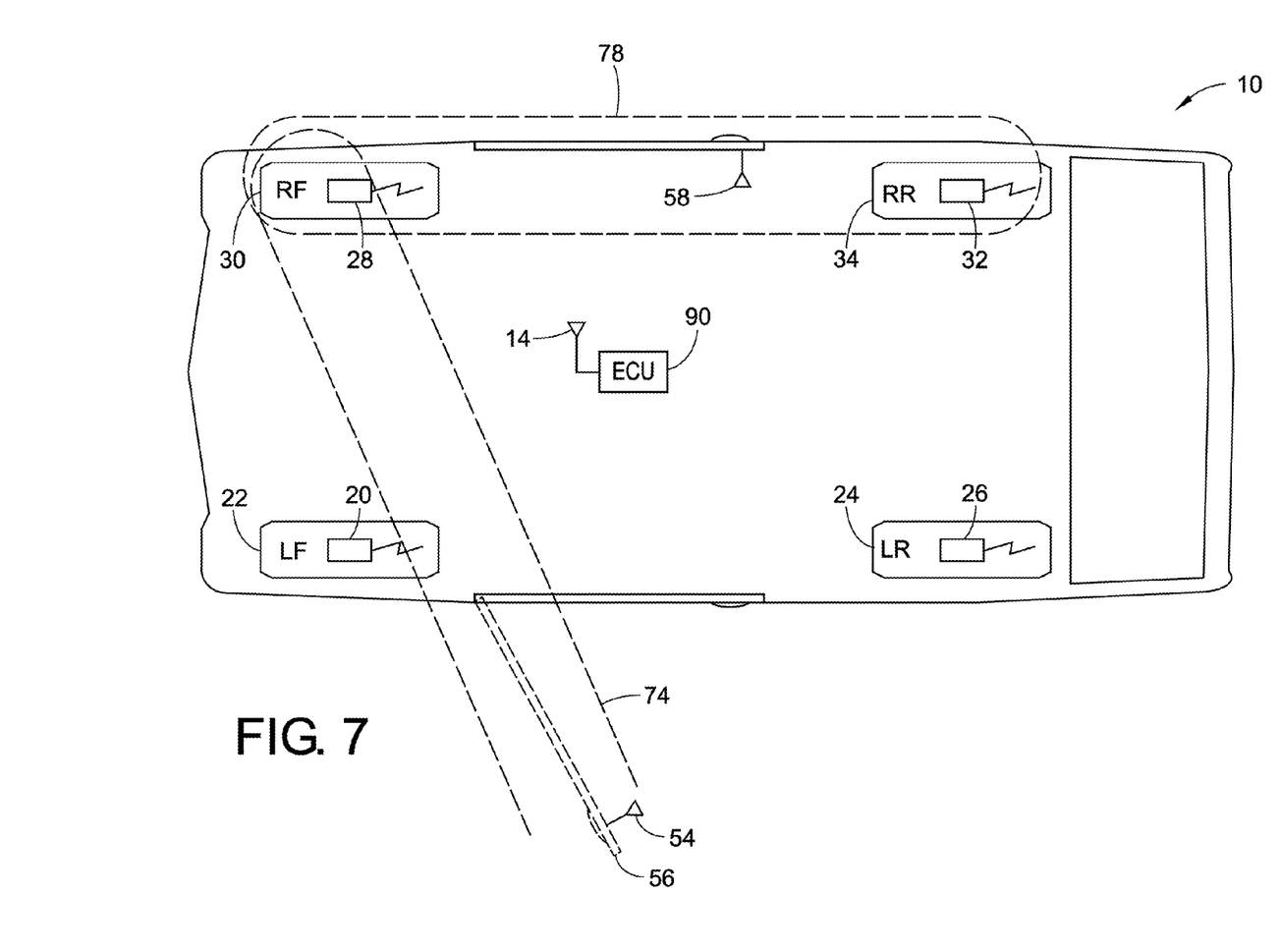
FIG. 7 is a schematic view of the vehicle shown in FIG. 1 with a door open and some of the components depicted in FIG. 1 have been omitted for clarity.

FIG. 7 depicts an alternative manner in which a tire sensor can be localized, i.e. the location of the respective tire sensor can be determined, where a door to the vehicle is open. FIG. 7 depicts the vehicle 10 shown in FIG. 1 with the left door 56 open (shown in phantom). All of the components depicted in FIG. 1 can be found in the vehicle depicted in FIG. 7, but most have been omitted from FIG. 7 for clarity. The ECU 90 is configured to receive identification signals from the respective tire sensors 20, 24, 28 and 32 and to determine locations of the respective tire sensors based on which antenna woke up the tire sensor transmitting the respective identification signal and whether the respective identification signal matches other received identification signals. The ECU 90 is further configured to localize a respective tire sensor, e.g. the RF tire sensor 28 in FIG. 7, based on matching identification signals being transmitted to the receiver 14 from the respective tire sensor in response to the LF tire sensor wake up field 74 (only a portion of the boundary of the wake up field 74 is shown in FIG. 7) from left side antenna 54, which is a door-mounted antenna, and the LF tire sensor wake up field 78 from the right side antenna 58, which is located on an opposite side of the vehicle 10. When the left door 56 is closed, the left LF wake up field 74 typically only awakens the left front tire sensor 20 and the left rear tire sensor 26. However, with the left door 56 open, the left LF wake up field can be directed in a diagonal direction, with respect to the longitudinal axis of the vehicle, and wake up the right front tire sensor 28 in addition to the left front tire sensor 20. In this example, the left rear tire sensor 26 is not awakened by the left LF field 74 when the left door 56 is open. In view of this, the ECU can localize the right front tire sensor 28 by comparing the received identification signals transmitted in response to the LF wake up fields 74 and 78 with the left door 56 open. Each received reply signal transmitted in response to the left side wake up field 74 and the right side wake up field 78 can include the identification of the right front tire sensor 28 when the left door 56 is open. Accordingly, the location of the right front tire sensor 28 can be determined.

Figure 8:
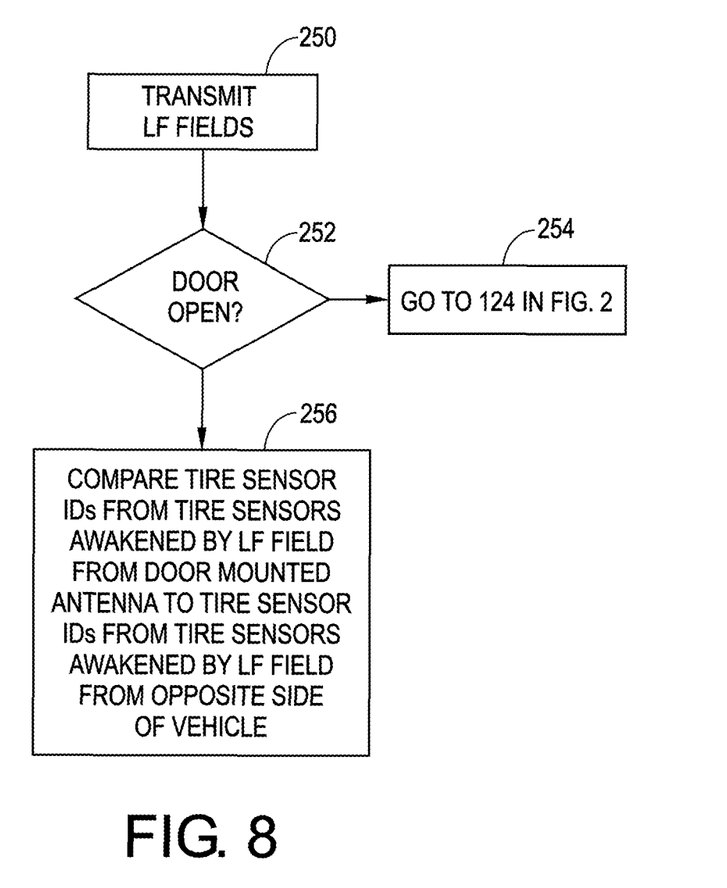
FIG. 8 is a flow diagram depicting a method for localizing a tire sensor with the door to the vehicle being open.

A method for localizing tire sensors where a door having a door mounted antenna is open, will be described with reference to FIG. 8. The method includes, at 250, transmitting low frequency ("LF") tire sensor wake up fields to wake up tire sensors located in tires on the vehicle. The LF tire sensor wake up fields can include a first LF tire sensor wake up field from a door-mounted LF antenna mounted to a door on a first side of the vehicle, e.g. the left side wake up field 74 shown in FIG. 7. The LF tire sensor wake up fields can also include a second LF tire sensor wake up field from a second antenna mounted on a second, opposite, side of the vehicle, e.g., the right side LF wake up field 78 in FIG. 7. As mentioned above, the door-mounted antenna, e.g. the left side antenna 54, is configured such that with the left door 56 being closed the left LF tire sensor wake up field 74 is configured to wake up two tire sensors, i.e. the left front tire sensor 20 and the left rear tire sensor 26, located in respective tires on the first (left) side of the vehicle. The method further includes, at 252, determining whether the door to which the door-mounted LF antenna is mounted is open. If the door is not open, then, at 254, the tire sensors can be localized in manners described above, e.g. by using the table shown in FIG. 3. In other words, the process could return to step 124 in FIG. 2. Where the door is open, at 252, localizing a respective tire sensor can be based on the respective identification signals received by the receiver 14 (FIG. 1) in response to the first LF tire sensor wake up field, e.g. the left LF field 74, and the second tire sensor wake up field, e.g. the right LF field 78, by, for example at 256, comparing the tire sensors woken up by the left wake up field 74 and the tire sensors woken up by the right wake up field 78. The received matching identification in this example would correspond to the right front tire sensor 28.

Learning tire sensor locations when in a vehicle manufacturing facility can present certain issues. Learning the location of the tire sensors at the end of the manufacturing line can provide certain benefits later on to more quickly localize the tire sensor the next time the ignition to the vehicle is turned ON. Locating the LF antennas away from the wheel wells, however, requires a higher power LF field to be generated to wake up the wheel sensors as compared to if the LF antennas were located within the wheel well. This can cause problems, since the vehicles on the assembly line are fairly close together. It may be possible that an LF wakeup field from an LF antenna on one vehicle might wake up the tire sensors located on an adjacent vehicle.

Figure 9:
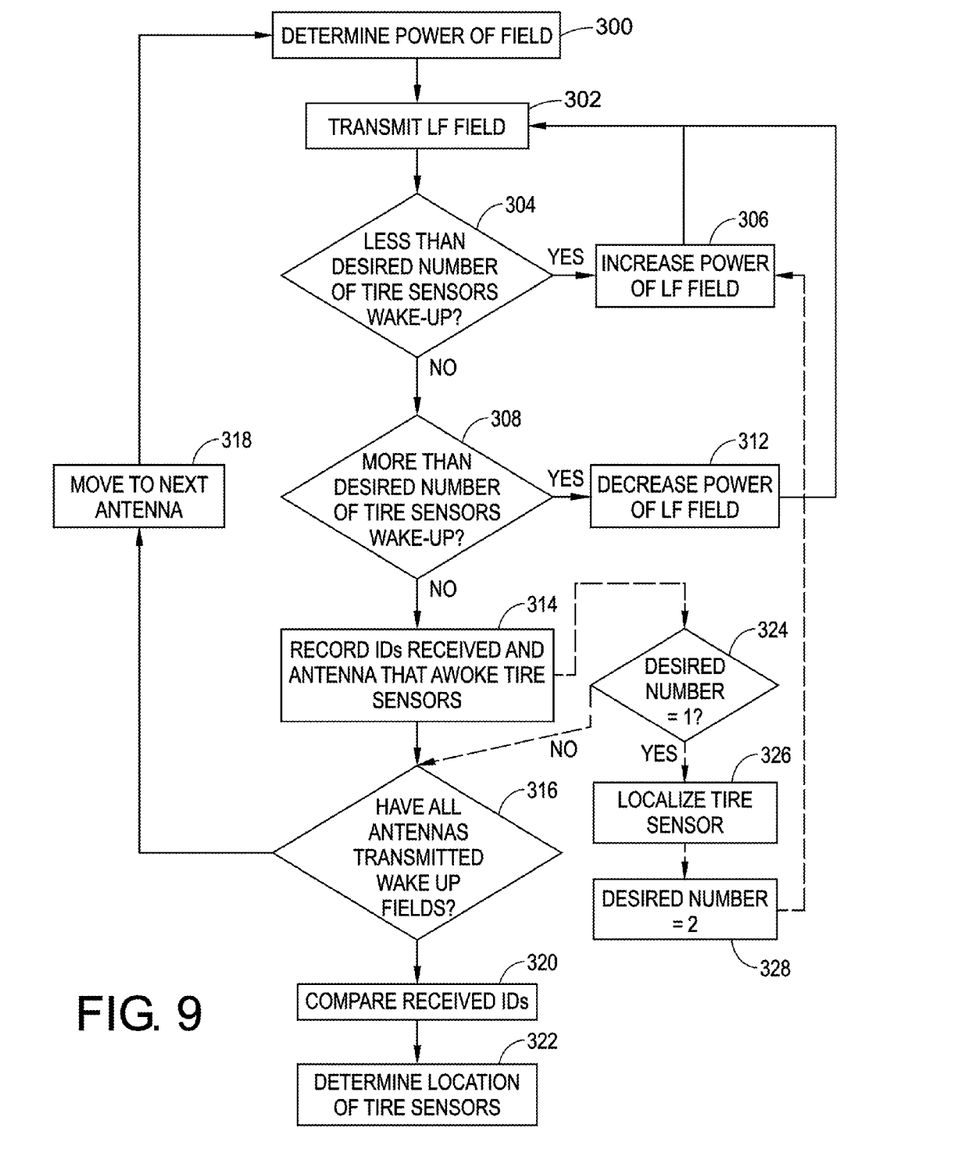
FIG. 9 is a flow diagram depicting a method for localizing tire sensors on a vehicle.

With reference to FIG. 9, a method for localizing tire sensors in a factory mode can include, at 300, setting or determining a power for an LF wakeup signal for waking up tire sensors on a vehicle. At 302, the LF field is transmitted from an LF antenna. For example, the front LF antenna 50 transmits an LF field having a first power in an attempt to wake up the front tire sensors 20 and 28. At 304, it is determined whether less than the desired number of tire sensors woke up. In the case of transmitting an LF field from the front antenna 50, it is determined whether the LF field woke up two tire sensors. Determining whether the desired number of tire sensors have awakened can be based on whether the RF receiver 14 receives the appropriate number of reply signals, e.g. two reply signals, from the respective tire sensors. If less than the desired number of tire sensors woke up, then at 306, the power of the LF field is increased and the LF field can be retransmitted at 302. If, at 304, less than the desired number of tire sensors were not woken up, then at 308, it is determined whether more than the desired number of tire sensors have woken up in response to the transmitted LF field. For example, if three or four tire sensors replied with an RF signal to the receiver 14 in response to the LF field generated by the front antenna 50, then there is a likelihood that tire sensors on an adjacent vehicle were woken up. If more than the desired number of tire sensors have woken up, then at 312, the power of the LF field can be decreased and the LF field can be retransmitted at 302. If not more than the desired number of tire sensors have woken up, then at 314, the unique identifications received from the tire sensors can be recorded in the memory 92 that is associated with the ECU 90, as well as the antenna that awoke the tire sensors. This information can be stored in a table, or similar organizational manner, as that shown in FIG. 3. At 316, a determination can be made as to whether all antennas have transmitted wake up fields. If all antennas (or a desired number of antennas) have not transmitted wake up fields, then the process moves to the next antenna, at 318, to then determine the power of the LF field, at 300, and transmit the LF field, at 302. If all antennas (or the desired number of antennas) have transmitted the wake up fields, then at 320, the ECU can compare the received Ds and at 322, can determine the location of the tires similar to the manners described above.

The method for localizing tire sensors can include determining a wake up field power, at 300, transmitting an LF wake up field having the wake up field power from an LF antenna on the vehicle, at 302, receiving an identification signal from each tire sensor awakened by the transmitted LF wake up field, and determining whether a desired number of tire sensors have woken up in response to the transmitted LF wake up field based on the received identification signals, at 304. When the desired number of tire sensors have woken up, the method can further include recording the identification signals received from the awakened tire sensors and the respective antennas that awoke the respective tire sensors, at 314. The method further includes determining whether a desired number of antennas have transmitted a respective LF wake up field, at 316. When the desired number of antennas have transmitted a respective LF wake up field, the method can further include comparing the received identification signals, at 320, and determining locations for the tire sensors, at 322, based on which respective antenna woke up which respective tire sensor and whether the received identification signals match other received identification signals. When less than the desired number of tire sensors wake up, at 304, the wake up field power can be increased, at 306. Another wake up field having an increased wake up field power can be transmitted by returning to 302. The identification signals can be received from each tire sensor awakened by the another wake up field and whether the desired number of tire sensor have woken up in response to the transmitted another wake up field based on the received identification signals can be determined at 304 and/or 308. When more the desired number of tire sensors wake up, at 308, the wake up field power can be decreased, at 312. Another wake up field having a decreased wake up field power can be transmitted by returning to 302. The identification signals can be received from each tire sensor awakened by the another wake up field and whether the desired number of tire sensor have woken up in response to the transmitted another wake up field based on the received identification signals can be determined at 304 and/or 308. When less than the desired number of antennas have transmitted a respective wake up field, at 316, another wake up field power can be determined at 300, another wake up field having the another wake up field power can be transmitted at 302, and the identification signals from each tire sensor awakened by the another transmitted wake up field can be received to determine if the desired number of tire sensor have woken up in response to the transmitted another wake up field based on the received identification signals at 304 and/or 308.

RSSI data can also be used in determining the location of the tire sensors while in factory mode. By using RSSI data fewer than all four of the antennas 50, 52, 54 and 58 may have to transmit LF fields to localize the tire sensors. For example, where the side antennas are located closer to the front of the vehicle, the front sensors 20 and 28 can transmit RSSI data to the receiver 14, after being awakened by the respective antennas 54 and 58, that indicates that a stronger LF field was detected as compared to the LF signal detected by the rear tire sensors 24 and 32 and the spare tire sensor 36. In addition, in comparing the received unique identifications, at 320, the spare tire sensor 36 will transmit its unique identification in response to the LF field transmitted by both the left antenna 54 and the right antenna 58. Accordingly, the localization of the spare tire sensor 36 can be determined.

The method can further include waking up individual tire sensors. As mentioned above the LF antennas 50, 52, 54, 58 and 66 are not located in a wheel well of the vehicle. Each LF antenna can be mounted on the vehicle closer to a respective tire sensor as compared to other tire sensors. The method can include determining a wake up field power, at 300, and transmitting an LF wake up field having the wake up field power from an LF antenna on the vehicle to wake up tire sensors mounted within tires on the vehicle at 302. The method can further include, at 304 and 308, determining whether a desired number of tire sensors have woken up based on an identification signal being received from a respective awakened tire sensor by a receiver on the vehicle in response to the LF wake up field. At 314, the identification(s) received from the awakened tire sensors can be recorded in the memory 92 that is associated with the ECU 90, as well as the antenna that awoke the tire sensor(s). The method can, at 324, determine whether the desired number of tire sensors that was/were awakened was one tire sensor. Where the desired number of tire sensors that was/were awakened was one tire sensor, at 326, the awakened tire sensor can be localized based on the antenna that awakened the tire sensor. For example, if the front LF antenna 50 is located nearer the left front tire sensor 20 and only one identification signal was received in response to the front wake up field generated by the front LF antenna, then the single identification signal received in response to the wake up field generated by the front LF antenna can be associated with the left front tire sensor 20. If desired, the desired number can then be set to two tire sensors, at 328, and the method can proceed to step 306. This can provide further assurance for proper location of the respective tire sensors.

The TPMS system described above can take other configurations useful when combining TPMS with SMART entry. For example, FIG. 10 schematically depicts a vehicle 340 having LF antennas not located within the wheel wells, but located elsewhere on the vehicle as compared to where the LF antennas are shown in FIG. 1. The vehicle 340 depicted in FIG. 10 can include the same components as the vehicle 10 depicted in FIG. 1, and therefore, for the sake of brevity only some of the components are shown in FIG. 10.

In the embodiment depicted in FIG. 10, the vehicle 340 can include a left front low frequency ("LF") antenna 350 mounted near a left front corner of the vehicle (e.g., on or near the front bumper), a left rear LF antenna 352 mounted near a left rear corner of the vehicle (e.g., on or near the rear bumper), a right front LF antenna 354 mounted near a right front corner of the vehicle (e.g., on or near the front bumper), and a right rear antenna 358 mounted adjacent near a right rear corner (e.g., on or near the rear bumper) of the vehicle. The vehicle 340 can also include other LF antennas that are not shown.

The left front antenna 350 is configured to transmit a front LF field 370 to wake up the front tire sensors 20, 28. The left rear LF antenna 352 is configured to transmit a left rear LF field 372 to wake up the rear tire sensors 24, 32. The left rear LF field 372 generated by the left rear LF antenna 352 can also be large enough to wake up the spare tire sensor 36 (see FIG. 1) on the spare tire 38 (FIG. 1), which can be located in the trunk 42. The right front antenna 354 is configured to transmit a right front LF field 374 to wake up the front tire sensors 20, 24. The right rear LF antenna is configured to transmit a right rear LF field 378 to wake up the rear tire sensors 24, 32. The right rear LF field 378 generated by the right rear LF antenna 358 can also be large enough to wake up the spare tire sensor 36 (see FIG. 1) on the spare tire 38 (FIG. 1), which can be located in the trunk 42. Each of the wake up fields can be about 125 KHz.

As was explained above, it can be desirable to combine components of a TPMS with components of a vehicle entry system such as a SMART system. In view of this, each antenna 350, 352, 354 and 358 can also be configured to transmit a SMART entry LF search field to wake up the fob 12 (FIG. 1). The antennas 350, 352, 354 and 358 that are used to wake up the tire sensors 20, 24, 28 and 32 can also be used to detect for the fob 12 when an operator of the vehicle is approaching the vehicle.

A vehicle entry/tire management system and methods of operating such a system have been described above with particularity. Modifications and alterations will occur to those upon reading and understanding the preceding detailed description. The invention is not limited to only the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle entry/tire pressure monitoring system for a vehicle, the system comprising:
   an electronic control unit ("ECU");
   low frequency ("LF") antennas mounted on the vehicle and being in communication with the ECU, each LF antenna being configured to transmit an LF tire sensor wake up field and a SMART entry LF search field to wake up a portable transmission/reception unit for keyless entry of the vehicle; and
   tire sensors mounted in, on or adjacent respective tires of the vehicle, each tire sensor being configured to take air pressure measurements for the respective tire including a two-axis receiver antenna and an RF transmitter configured to transmit a radio frequency ("RF") signal, wherein the two-axis antenna is configured such that a first axis of the two-axis antenna is configured to detect a respective LF field transmitted by one of the LF antennas and a second axis of the two-axis antenna is configured to detect a respective LF field transmitted by another of the LF antennas,
   wherein the LF antennas include a first LF antenna mounted nearer a longitudinal centerline of the vehicle as compared to an outboard side of the vehicle and a second LF antenna mounted nearer the outboard side of the vehicle as compared to the longitudinal centerline of the vehicle, and
   wherein the first axis is arranged generally transverse to the longitudinal centerline of the vehicle, and the second axis is arranged generally parallel with the longitudinal centerline of the vehicle.

2. The system of claim 1, wherein the RF signal transmitted from each tire sensor includes an identification signal associated with a respective tire sensor, wherein the ECU is configured to receive the identification signals from the respective tire sensors and to determine locations of the respective tire sensors based on which antenna woke up the tire sensor transmitting the respective identification signal and whether the respective identification signal matches other received identification signals.

3. The system of claim 2, further comprising a memory associated with the ECU, wherein the ECU is further configured to store the identification signals in the memory upon detecting an ignition of the vehicle is OFF, wherein the identification signals are associated with the respective tires or tire sensors.

4. The system of claim 2, wherein each LF antenna is positioned closer to one of two tire sensors woken up by the LF antenna transmitting the LF field, wherein each tire sensor includes a received signal strength indication ("RSSI") circuit for generating a RSSI data that is a function of radiated power from respective LF fields being picked up by the two-axis antenna, wherein the RF signal transmitted by the tire sensors includes the RSSI data, wherein the ECU is further configured to determine locations of the respective tires based on RSSI data.

5. The system of claim 1, further comprising a radio configured to receive AM broadcast signals in communication with the ECU, wherein the ECU is configured to (1) delay start up of the radio while the antennas transmit LF fields to wake up the tire sensors, or (2) inhibit the radio from emitting sound from speakers in communication with the radio while the antennas transmit LF fields to wake up the tire sensors.

6. A vehicle entry/tire pressure monitoring system for a vehicle, the system comprising:
   an electronic control unit ("ECU");
   low frequency ("LF") antennas mounted on the vehicle and being in communication with the ECU, each LF antenna being configured to transmit an LF tire sensor wake up field and a SMART entry LF search field to wake up a portable transmission/reception unit for keyless entry of the vehicle; and
   tire sensors mounted in, on or adjacent respective tires of the vehicle, each tire sensor being configured to take air pressure measurements for the respective tire including a two-axis receiver antenna and an RF transmitter configured to transmit a radio frequency ("RF") signal, wherein the two-axis antenna is configured such that a first axis of the two-axis antenna is configured to detect a respective LF field transmitted by one of the LF antennas and a second axis of the two-axis antenna is configured to detect a respective LF field transmitted by another of the LF antennas,
   wherein the LF antennas includes a front LF antenna mounted towards a front of the vehicle, a rear LF antenna mounted towards a rear of the vehicle, a left side LF antenna mounted adjacent, in or on a left door of the vehicle, and a right side LF antenna mounted adjacent, in or on a right door of the vehicle,
   wherein the first axis is arranged generally transverse to a longitudinal axis of the vehicle, and the second axis is arranged generally parallel with a longitudinal axis of the vehicle.

* * * * *